United States Patent [19]
Sonnerat

[11] 3,869,180
[45] Mar. 4, 1975

[54] RAILWAY JOURNAL BOX BEARING RACE MOUNTING

[75] Inventor: Claude Sonnerat, Annecy, France

[73] Assignee: Societe Nouvelle de Roulements, Annecy, France

[22] Filed: Sept. 12, 1972

[21] Appl. No.: 288,261

[30] Foreign Application Priority Data
Sept. 30, 1971 France .............................. 71.35299

[52] U.S. Cl............. 308/180, 105/224.1, 295/36 A
[51] Int. Cl..... B61c 15/12, B61c 15/20, F16c 13/02
[58] Field of Search......... 295/36 A, 36 R; 308/180; 105/224.1

[56] References Cited
UNITED STATES PATENTS

| | | | |
|---|---|---|---|
| 1,638,957 | 8/1927 | Pitt | 308/180 |
| 1,762,411 | 6/1930 | O'Connor | 308/180 |
| 1,812,127 | 6/1931 | Wisner et al. | 295/36 A |
| 2,018,949 | 10/1935 | Couch | 308/180 |
| 2,197,499 | 4/1940 | Heinze | 308/180 X |
| 2,470,071 | 5/1949 | Hilton | 308/180 |
| 2,537,432 | 1/1951 | Triplett | 308/180 |
| 3,131,006 | 4/1964 | Anderson | 308/180 X |

Primary Examiner—M. Henson Wood, Jr.
Assistant Examiner—Howard Beltran
Attorney, Agent, or Firm—Stevens, Davis, Miller & Mosher

[57] ABSTRACT

In this railway axle box bearing mounting two rows of cylindrical rollers are disposed between the axle and the box body; between these rows, a single-row or two-row ball bearing of the oblique contact type is interposed; the roller bearings bear the radial load alone, and the ball bearing bear the axial load alone, in either direction.

4 Claims, 2 Drawing Figures

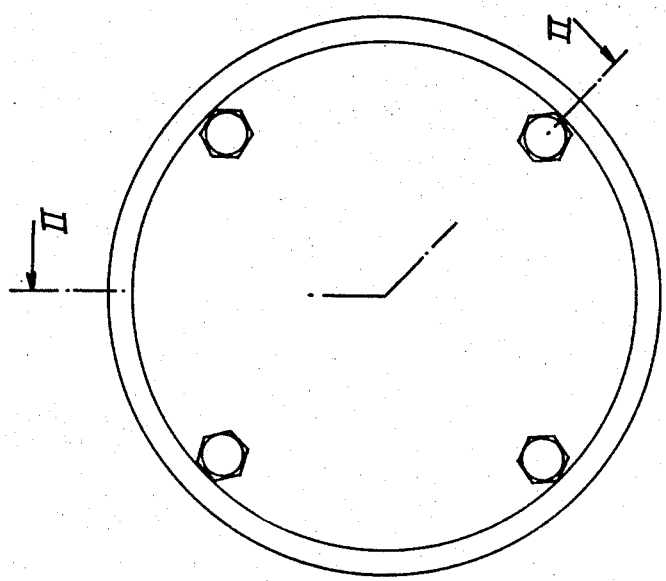
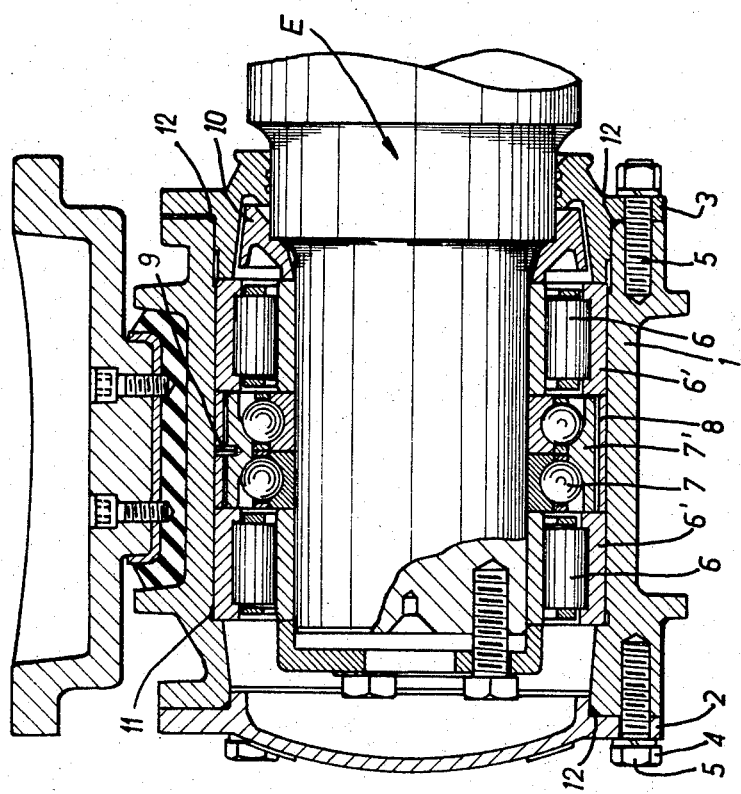

RAILWAY JOURNAL BOX BEARING RACE MOUNTING

The present invention relates to mounting devices for bearings, applicable notably to railway axle boxes but adapted to be used in other structures.

The mounting device according to this invention is illustrated by way of example in the attached drawing, in which:

FIG. 1 is an end view of the axle box, and

FIG. 2 is a section taken along the line II—II of FIG. 1.

Referring to the drawing and more particularly to FIG. 2, it will be seen that the axle proper is designated by the reference letter E. Mounted to this axle E is the axle box body 1 comprising a front lid 2 and a rear lid 3 secured to the box body by means of bolts 4 and studs 5, respectively.

The mounting device according to this invention is characterised essentially in that it comprises the arrangement of two suitably spaced sets of roller bearings 6 and a pair of single-row or two-row ball bearings of the angular or oblique contact type, disposed between said two sets of roller bearings 6. A distance ring or separator 8 is clamped in the axial direction between the outer races 6' of roller bearings 6, the width of this ring 8 being greater than that of the outer race of ball bearing 7 to avoid any undue overloading of the latter. A radial pin 9 rigid with said distance ring 8 engages a corresponding hole formed in the outer race 7' of ball bearing 7 to prevent any detrimental rotation thereof.

The cylindrical-roller bearings 6 receive only the radial load, and the single-row or two-row bearing or bearings 7 of the angular contact type receive only the axial load in either direction.

The roller bearing 6 and ball bearing 7 are fitted between an inner shoulder 11 of the box body 1 and a rear distance-piece 10. The box is sealed by means of conventional O-rings 12.

It may be pointed out by way of reference and in order to afford a better understanding of the state of the art that well known prior arrangements endeavoured to solve the same problem, i.e., the absorption of axial loads by the axle box. Thus, for example, axle boxes have already been proposed wherein a set of cylindrical roller bearings are mounted symmetrically, the axial clearance or play being restricted by abutment rings possibly compensated by spring washers or like members.

However, these arrangements involve the axial movements of the bearing rollers on their races or tracks, and the absorption of axial loads by bearing action. As a consequence of the direct contact between the flat end faces of the rollers with the side edges of their races, generating detrimental frictional contacts at high speed, the bearings wear out very rapidly and must be replaced at frequent intervals.

This inconvenience is further accentuated by the present trend towards higher service speeds and therefore higher loads in modern railway systems, thus making the hitherto accepted structure inadequate on account of their unduly short useful life.

The solution proposed with the mounting device according to this invention is advantageous for the following reasons: it reduces the axial play in the rollers and eliminates any axial thrust absorption by these rollers; besides, the design of the inner races of the roller bearings is simplified.

Furthermore, a certain axial clearance is maintained for absorbing and damping out axial accelerations.

The reaction torque of the bearing is reduced, and all the stresses are absorbed only by rolling contacts.

This arrangement and the type of bearings incorporated therein ensure a satisfactory efficiency and load-capacity of the bearing box, and constitutes a particularly efficient solution to the difficult problems arising from high loads at high speeds.

Of course, a rubber pad or like mounting member is interposed between the axle box and the wheel.

Although a single form of embodiment of the invention has been shown and described herein, it will readily occur to those conversant with the art that various modifications and variations may be brought thereto without departing from the basic principle of the invention as set forth in the appended claims.

What is claimed as new is:

1. Apparatus for rotatably mounting an axle body in an axle box, comprising: a first set of outer roller bearing races fixed to said axle box; a first set of inner roller bearing races fixed to said axle body; a first set of cylindrical rollers disposed between said first sets of inner and outer bearing races for bearing substantially only radial loads developed between said axle body and axle box; a second set of outer roller bearing races fixed to said axle box and spaced from said first set of outer bearing races; a second set of inner roller bearing races fixed to said axle body and spaced from said first set of inner bearing races; a second set of cylindrical rollers disposed between said second sets of inner and outer bearing races for bearing substantially only said radial loads; a distance member axially clamped between said first and second sets of outer bearing races; at least one set of outer and inner ball bearing races disposed concentrically with respect to said distance member and between said first and second sets of roller bearing races; and at least one set of ball bearings located in angular or oblique contact between said outer and inner ball bearing races for bearing substantially only axial loads developed between said axle body and axle box, said distance member being ring-shaped and having an axial width greater than the axial width of said at least one outer ball bearing race.

2. The apparatus according to claim 1, wherein said outer ball bearing race and said distance ring member are radially spaced apart from each other, said apparatus further comprising a radial pin rigidly coupling said distance member and outer ball bearing races to each other for preventing rotation of said outer ball bearing race.

3. The apparatus according to claim 2, further comprising a second set of outer and inner ball bearing races disposed axially adjacent said first set of ball bearing races between said first and second sets of roller bearing races, and at least a second set of ball bearings located between said second outer and inner ball bearing races for bearing substantially only axial loads developed between said axle body and axle box.

4. The apparatus according to claim 3, wherein the two outer ball bearing races are formed in a single outer ball bearing race member, said radial pin coupling said single outer ball bearing race member to said distance ring member to prevent rotation of the single ball bearing race member.

* * * * *